United States Patent [19]

DiGuiseppi

[11] 4,349,734
[45] Sep. 14, 1982

[54] FLOW DETECTOR FOR SOLIDS
[75] Inventor: Frank T. DiGuiseppi, Trenton, N.J.
[73] Assignee: Cities Service Company, Tulsa, Okla.
[21] Appl. No.: 186,107
[22] Filed: Sep. 11, 1980
[51] Int. Cl.³ .............................................. H01J 39/12
[52] U.S. Cl. ................................. 250/222 R; 250/227
[58] Field of Search ................ 250/223 R, 222 R, 227

[56] References Cited
U.S. PATENT DOCUMENTS 4,035,635  7/1977  Crosland et al. ............... 250/223 R
4,166,948  9/1979  Steffen ......................... 250/223 R X Primary Examiner—David C. Nelms
Assistant Examiner—Darwin R. Hostetter
Attorney, Agent, or Firm—George L. Rushton; Robert H. Sproule

[57] ABSTRACT

The invention concerns the flow and measurement of divided solids in small diameter tubes at high pressures. A flow channel is drilled through a metal block. A second channel is drilled so that the second channel intersects the first channel at a right angle. A beam of light, sent through an optical fiber in the second channel, travels across the first channel and is received and recorded in the distal end of the extension of the second channel. Interruptions of the light beam, due to the passage of solids along the first channel, are translated into indications of the flow of the solids.

14 Claims, 2 Drawing Figures

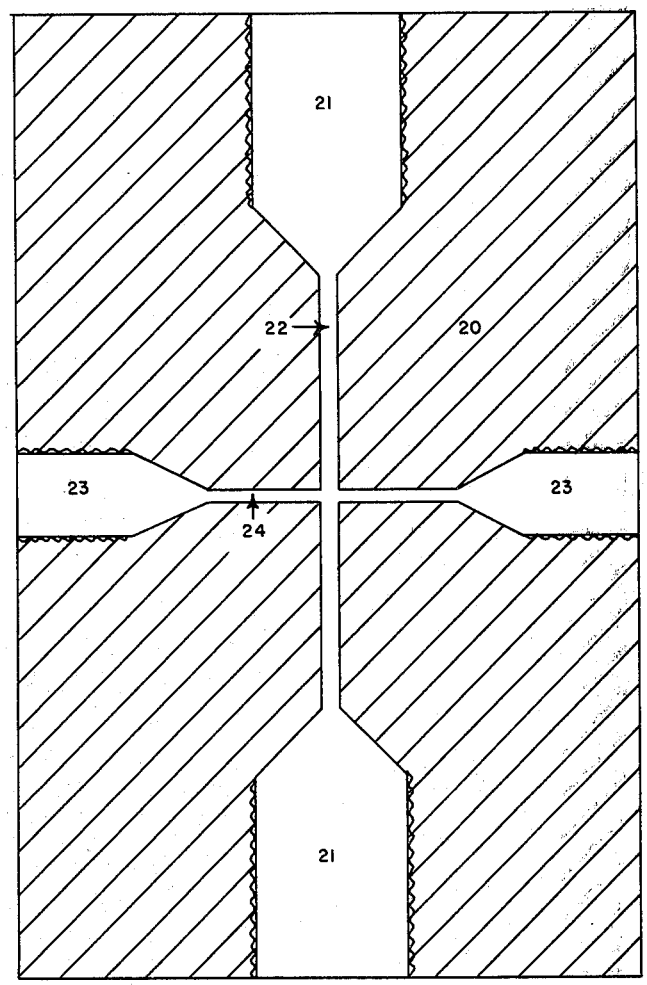
Fig. II

FLOW DETECTOR FOR SOLIDS

BACKGROUND OF THE INVENTION

This invention broadly concerns the detection and semi-quantitative measurement of the flow of solids. More particularly, it concerns the flow of divided solids in small diameter tubes at high pressures. In one aspect of the utility of this invention, it can be used to measure a low rate of flow of crushed coal in a small diameter tube at a high pressure.

One prior art method of measuring a flow of solids concerns a pressure drop measurement, such as in a coal transport line. Broadly, this concerns the measurement of the change in pressure ($\Delta P$) at separated points along the tube. Experience shows that this method is not reliable because the high pressure ($\Delta P$) transmitters capable of withstanding wide pressure fluctuations are not sensitive enough to measure the pressure. And this method is not applicable to a low flow rate of solids in small diameter lines or tubes.

Another prior art method concerns the measurement of the enthalpy balance/temperature. This involves, for example, heating a transport gas stream to about 200° F. upstream of where the gas is mixed with the coal, which is at ambient temperature. Then, when the coal flow starts, the temperature of the mixture downstream of the mixing point decreases. The upstream and downstream temperatures are then compared by thermocouples, referenced to each other, with the temperature difference being displayed on a recorder. This method has been found somewhat unreliable due to drift, caused by small ambient and process variations affecting the temperature readings. Also, at low flows of transport gas and coal, the signal-to-noise ratio gives unreliable readings, because the low flow of coal does not carry enough heat to give an appreciable temperature differential ($\Delta T$) over the ambient readings.

I have found that my invention overcomes or avoids these disadvantages and that low flow rates of solids in a small diameter tube, at high pressures and high temperatures, can be detected and semi-quantitatively measured.

SUMMARY OF THE INVENTION

The apparatus for measuring flow of solids under the above conditions broadly comprises a chamber or housing defining a portion of a continuous conduit. The chamber has a through passageway communicating with the conduit to provide a continuous path for the flow, under pressure, of solid material, from one end of the conduit to the other end. There is also a second conduit that intersects the first conduit at the chamber, akin to an intersecting of two streets, with the second conduit providing a pathway for light. A light source placed at one end of this second conduit emits light which travels to the second, or opposite, end of this conduit, with the light traversing the path of any solid material moving through the first conduit. At the second end of the second conduit, there is a light detector, with associated means for registering and detecting variations in light intensity received at the second end of the conduit. These variations are useful in detecting the presence of and providing a measure of the solid material flowing through the passageway. The apparatus is constructed to withstand pressures up to the region of 5000 psi and a vacuum of about 29 in Hg.

The method of detecting and measuring the flow of solids through a small diameter tube, at low flow rates and at high pressure, uses the above-described apparatus. Solid particles, of a size to fit the flow tube, are introduced into the tube, with or without the aid of a transport gas. The solids move along, or through, the tube and interrupt a light beam that has a radiation path normal to the flow path of the solids through the passageway. This interrupted light beam, upon entering a light detector placed in the beam path on the other side of the flow path of the solids from the light source, causes variations in the output signal of the detector. This varied output voltage can be used for diverse purposes, such as to indicate "flow" or "no-flow" modes, or to record the variations, or to regulate devices that can control the flow of solids.

DESCRIPTION OF THE DRAWINGS

FIG. I is a block diagram of one embodiment of the invention.

FIG. II is a cross-section view of the housing block of FIG. I.

DETAILED DESCRIPTION OF THE DRAWINGS

Figure 1:
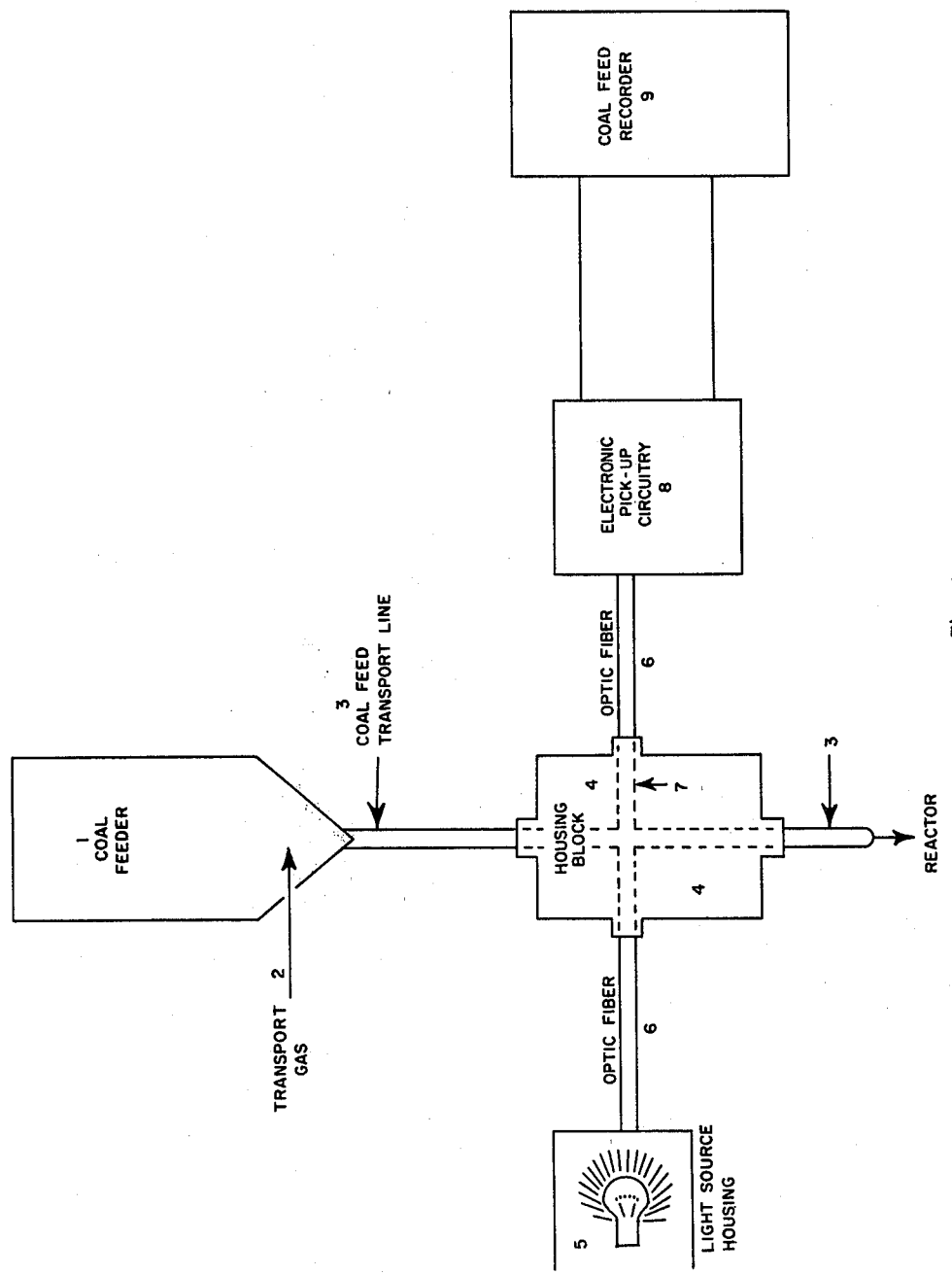

This apparatus and method can be used in the "coal feeding" section of the process described in U.S. Pat. No. 3,960,700, in which ground coal is hydropyrolyzed with hot hydrogen to produce a mixture of gases, liquids, and solids. The present apparatus and method have an important utility in the process of this patent to detect and indicate the flow of coal to the reactor.

Referring to FIG. I, coal feeder 1, optionally assisted by transport gas 2, provides ground coal for use in a hydrogenation reactor, not shown. The coal and gas travel along the first continuous conduit 3 and into, through, and out of housing block or chamber 4, continuing along conduit 3 to the reactor. The particular embodiment of block 4, further shown in FIG. II, comprises a conduit drilled, or otherwise fashioned, through a block of metal. Suitable means are known and used to connect conduit 3 with the conduit or channel drilled in block 4, to form an extension of this first conduit which also continues past the end of block 4 into the reactor.

Also found in block 4 is a second conduit or channel 7 drilled at right angles to and intersecting the first conduit. The first conduit 3 conveys the mixture of coal and gas, while the second conduit 7 is associated with the light-emitting and -detecting means of the apparatus.

A light source 5, such as a source of visible light, is connected with a means of transmitting the light, such as by an optic fiber 6, to housing block 4. The light brought into block 4 passes normal to and through the stream of coal and gas and proceeds down the continuation of channel 7, exiting block 4, and continuing along another conduit, such as another optic fiber 6, to a detector or circuit pick-up means 8, such as a photoelectric cell. In 8, the light beam that has traveled from 5 through 6 and 7 to 8 is converted into an electrical signal, this conversion being well known. This converted signal then goes to a recorder 9, or to some other device which can be adapted to control or regulate. In the present apparatus, the transmitted signal formed in 8 and sent to 9 operates a recorder that notes variations in the amount of light transmitted from 5 to 8 and thus detects, indicates, and semi-quantitatively measures the passage of solid material along line 3.

The present apparatus is associated with solids handling equipment. Large scale solids handling equipment, such as a coal slurry pipe line or a grain conveyor, typically operates under conditions not far from ambient temperature and pressure. The present apparatus, and method, is designed for use at a fairly low feed rate, such as from about ¼ to about 60 lbs./hr., using a small diameter transport tube, from about 0.08 to about 0.7 inch I.D., such as about 0.12 inch, at pressures varying from vacuum to high pressure (about 5000 psi.) and at temperatures varying from ambient to about 1000° F. (538° C.).

FIG. II exemplifies one embodiment by which the apparatus can be adapted to accomodate high temperatures and high pressures.

The housing block in this figure can be a piece of metal, such as steel bar stock 20. Openings 21—21 show the inlet and outlet ports connecting the incoming and exiting conduit with the housing block. Passageway 22 is the continuation of the conduit through the block 20. At right angles to 22 is located conduit 24, which connects inlet and outlet ports 23, the connections for the optical system. Ports 21 and 23 can have threaded portions to assist in forming gas-tight connections with the conduits entering and exiting block 20. As one example of the dimensions of the apparatus, openings 21 are drilled and tapped for ½" male fittings, while openings 23 are drilled and tapped for ⅛" male fittings. The bore of line 22 is 0.125", while line 24 has a bore of 0.062".

Other materials and line and outlet sizes can be used, depending on the application of the apparatus and the operating parameters.

In one aspect of this system, the coal feeder operates under pressure, since it feeds coal to a high pressure reactor. Thus, coal feeder 1, transport conduit 3, and housing block 4, with associated passageways, are designed for pressure operation. These portions of the total system can be designed to operate at pressures from a vacuum to about 5000 psi. Material to handle this variation of pressure is well known and need not be discussed here.

The optical system for this apparatus can also accommodate wide fluctuations in pressure and temperature. The light source and housing typically can be any of a variety of such pieces of apparatus. For example, the light source can be an incandescent bulb, a fluorescent tube, an infrared or ultraviolet source, or a laser. For convenience and ease of operation, a small wattage incandescent bulb is a preferred choice. Likewise, the housing is designed to direct radiation from the source along a conduit to the housing block, at the same time to keep extraneous radiation from going to the housing block.

An optic fiber, a means of transmitting light radiation from the light source to the housing block and from the housing block to the electronic pick-up circuitry, is an important part of the apparatus. For example, a quartz fiber can be fitted, with a pressure fitting, into the housing block, such as where conduit 24 intersects passageway 22 in FIG. II. The squared-off end of the fiber can be placed in conduit 24 so that the end of the fiber is flush with the wall surface at the intersection of 22 and 24, thus presenting minimum resistance to the flow of solids along 22. A similar fitting in the opposite portion of 24 enables any light radiation not blocked by solids flowing down 22 to be carried along fiber 6 (FIG. I) into the electronic pick-up box 8. Due to its inherent physical and chemical properties, quartz is well adapted for use as an optic fiber in this apparatus. For example, in FIG. II, conduit 24 can be of such a size as to give a close fit for an optical fiber of approximately 1/16 " O.D., with opening 23 housing a pressure fitting that accommodates the optic fiber, the whole system being pressure-tight up to the region of about 5000 psi and including a vacuum of up to about 29" Hg.

As an alternative to an optical system involving optic fibers, a high pressure window can be installed on either side of passageway 22, at the intersection of 22 and 23, so that light originating in one arm of 23 can be transmitted through one window, across the passageway 22, through the second window, and then to the pick-up circuitry. Quartz windows, properly installed to be pressure resistant and to offer minimum resistance to flow along passageway 22, are one example of an alternative.

Electronic pick-up 8 of FIG. I is one of a number of "black box" circuits designed to receive light radiation from fiber 6, to convert the light radiation into an electronic signal and to transmit this electronic signal to a downstream "black box", such as coal feed recorder 9. Such circuitry is well known and need not be discussed here.

The circuitry can be adjusted to give full scale deflection for flow conditions varying from no flow to full flow.

By the use of the above-described apparatus, a flow of solids along a tube or line can be detected. By further refinement, this flow can be analyzed, such as a qualitative or quantative rate of flow, or the output signal from the electronic pick-up can be used for further purposes, such as regulating the flow.

I claim:

1. An apparatus for detecting and measuring flow rates of solids material under high pressure, comprising:
   (a) a first continuous conduit for the passage of said solids material therethrough, said first conduit (solids conduit) connected in an airtight manner to a solids inlet line and a solids outlet line respectively, at opposite ends of said solids conduit, in order to maintain high pressure therein;
   (b) a second continuous conduit for the passage of light therethrough, said second conduit (light conduit) intersecting and communicating with said solids conduit in an airtight manner, said light conduit sealed from the outside atmosphere by a light conductive means located within said light conduit at opposite sides of said solids conduit in order to maintain a high pressure therein;
   (c) a light source for transmitting light through the light conducting means, with a portion of the light being interrupted by the solids material passing through said solids conduit; and
   (d) means for measuring and registering the difference in light intensity within said light conduit before and after the light is interrupted by the solids material, the difference in light intensity representative of the difference in amount of solids material present in the path of the light, and thereby a measure of the flow rates of solids material through the solids conduit.

2. The apparatus as recited in claim 1 wherein said light conducting means comprises two transparent windows.

3. The apparatus as recited in claim 1 wherein the light conducting means comprises two optical fibers, said optical fibers connected to said light source and said light measuring/registering means respectively.

4. The apparatus as recited in claim 2 or claim 3 wherein said solids conduit and said light conduit respectively, comprise passageways within a one piece solid structure, said structure being airtight and having sufficient strength to withstand high pressure and high temperature within said passageways.

5. The apparatus as recited in claim 4 wherein:
(a) the solid structure comprises a metallic material;
(b) the pressure inside said solids conduit and said light conduit can vary from a vacuum of about 29 inches Hg to a positive pressure of about 5000 psig.; and
(c) the temperature inside said solids conduit and said light conduit can vary from about ambient to about 1000° F. (538° C.).

6. The apparatus as recited in claim 5 wherein:
(a) the bore diameter of the solids conduit is from about 0.08 inches to about 0.70 inches; and
(b) the solids material flow rate capable of being measured and registered is from about ¼ lb./hr. to about 60 lbs./hr.

7. The apparatus as recited in claim 6 wherein:
(a) the solids material is coal; and
(b) the solids inlet line is connected to a coal feeder, and the solids outlet line is connected to a coal reactor.

8. A method of detecting and measuring flow rates of solids material under high pressure, comprising the steps of:
(a) passing solids through a first continuous conduit, said first conduit (solids conduit) connected in an airtight manner to a solids inlet line and a solids outlet line respectively, at opposite ends of said solids conduit, such that high pressure can be maintained therein;
(b) passing light through a second continuous conduit, said second conduit (light conduit) intersecting and communicating with said solids conduit in an airtight manner, said light conduit sealed from the outside atmosphere by a light conducting means located within said light conduit at opposite sides of said solids conduit in order to maintain high pressure therein, a portion of said light interrupted by the solids passing through said solids conduit;
(c) measuring and registering the difference in light intensity inside said light conduit before and after the light is interrupted by the solids material, the difference in light intensity representative of the difference in amount of solids material present in the path of the light, and thereby a measure of the flow rates of solids material through said solids conduit.

9. The method as recited in claim 8 additionally comprising the step of using two transparent windows as a light conducting means.

10. The method as recited in claim 8 additionally comprising the steps of using two optical fibers as a light conducting means, the optical fibers connected to said light source and said light measuring/registering means respectively.

11. The method as recited in claim 9 or claim 10 additionally comprising the step of utilizing passageways within a one piece solid structure for said solids conduit and said light conduit respectively, said structure being airtight and having sufficient strength to withstand high pressures and high temperatures within said passageways.

12. The method as recited in claim 11 additionally comprising the steps of:
(a) forming said solid structure out of a metal material;
(b) varying the pressure inside said solids conduit and light conduit from a vacuum of about 29 inches of Hg to a positive pressure of about 5000 psig.; and
(c) varying the temperature inside said solids conduit and said light conduit from about ambient to about 1000° F. (538° C.).

13. The method as recited in claim 12 additionally comprising the steps of:
(a) utilizing a solids conduit bore diameter from about 0.08 inches to about 0.70 inches; and
(b) measuring/registering a solids material flow rate between about ¼ lb./hr. and about 60 lbs./hr.

14. The method as recited in claim 13 additionally comprising the step of connecting the solids inlet line to a coal feeder, and the solids outlet line to a coal reactor, in order to measure the flow rate of coal through said solids conduit.

* * * * *